(12) United States Patent
Kitagawa

(10) Patent No.: US 8,314,521 B2
(45) Date of Patent: Nov. 20, 2012

(54) VEHICLE DRIVE DEVICE

(75) Inventor: Katsuhide Kitagawa, Seto (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 267 days.

(21) Appl. No.: 12/746,442

(22) PCT Filed: Nov. 10, 2008

(86) PCT No.: PCT/JP2008/070412
§ 371 (c)(1),
(2), (4) Date: Jun. 4, 2010

(87) PCT Pub. No.: WO2009/072372
PCT Pub. Date: Jun. 11, 2009

(65) Prior Publication Data
US 2010/0259118 A1   Oct. 14, 2010

(30) Foreign Application Priority Data

Dec. 6, 2007 (JP) ................................. 2007-315420

(51) Int. Cl.
*H02K 9/00* (2006.01)
*F16L 3/227* (2006.01)
*F16L 3/04* (2006.01)
(52) U.S. Cl. ................. 310/54; 310/52; 310/58; 310/59
(58) Field of Classification Search ..................... 310/54, 310/52, 58, 59
See application file for complete search history.

(56) References Cited

U.S. PATENT DOCUMENTS

| 1,996,775 | A | * | 4/1935 | Sims .............................. 228/158 |
| 5,821,653 | A | * | 10/1998 | Kinto et al. ...................... 310/89 |
| 6,340,339 | B1 | | 1/2002 | Tabata et al. |
| 6,992,411 | B2 | * | 1/2006 | Houle et al. .................... 310/52 |
| 2004/0012272 | A1 | * | 1/2004 | Houle et al. .................... 310/54 |
| 2004/0134693 | A1 | * | 7/2004 | Yamagishi et al. .......... 180/65.1 |
| 2005/0067904 | A1 | * | 3/2005 | Houle et al. .................... 310/54 |

(Continued)

FOREIGN PATENT DOCUMENTS

EP          1101988 A2  *  5/2001

(Continued)

OTHER PUBLICATIONS

International Preliminary Report on Patentability for PCT/JP2008/070412 (5 pages) mailed Aug. 12, 2010.

*Primary Examiner* — Quyen Leung
*Assistant Examiner* — Alex W Mok
(74) *Attorney, Agent, or Firm* — Sughrue Mion, PLLC

(57) ABSTRACT

A vehicle drive device (1) comprises a motor unit which is provided with a motor case (10), a motor cover (23), a stator (20), a rotor (24), a rotor shaft (25), a resolver (15) for detecting the rotation angle of the rotor (24), a temperature sensor (12) for detecting the temperature of a stator coil (21), a rotor bearing (17) for supporting the rotor shaft (25), a terminal base (11) to which the terminals of U-phase, V-phase, and W-phase from the end of the coil are connected, and to which a resolver harness (14) and a temperature sensor harness (13) are also connected, and a delivery pipe (30) which has a clamp part (35) for holding the resolver harness (14) and delivers a cooling oil to the end of the coil.

4 Claims, 4 Drawing Sheets

U.S. PATENT DOCUMENTS

2006/0220479 A1 10/2006 Hasegawa
2008/0023177 A1* 1/2008 Hassett et al. ........... 165/104.33

FOREIGN PATENT DOCUMENTS

| | | | | |
|---|---|---|---|---|
| EP | 1229282 | A2 | * | 8/2002 |
| EP | 1512898 | A1 | * | 3/2005 |
| EP | 1528306 | A1 | * | 5/2005 |
| EP | 1529996 | A1 | * | 5/2005 |
| FR | 2778961 | A1 | * | 11/1999 |
| FR | 2824615 | A1 | * | 11/2002 |
| GB | 2402962 | A | * | 12/2004 |
| JP | 53-003605 | A | | 1/1978 |
| JP | 2000-094972 | A | | 4/2000 |
| JP | 2000-358345 | A | | 12/2000 |
| JP | 2003-324901 | A | | 11/2003 |
| JP | 2005-254855 | A | | 9/2005 |
| JP | 2006-033939 | A | | 2/2006 |
| JP | 2006-273186 | A | | 10/2006 |
| JP | 2007244025 | A | * | 9/2007 |
| JP | 2007-312569 | A | | 11/2007 |

* cited by examiner

VEHICLE DRIVE DEVICE

TECHNICAL FIELD

The present invention relates to a vehicle drive device comprising a motor for driving a vehicle, a resolver which is placed in a motor case to detect a rotation angle of a rotor, and a plurality of cooling oil paths through which a cooling oil is supplied to a coil end of a stator.

BACKGROUND ART

Conventionally, in electric vehicles, hybrid vehicles, or other vehicles, efforts have been made to reduce a shaft length of a drive device by means of improving an arrangement of a resolver located between a motor and a transmission and improving a method for fixing a resolver harness. For example, Patent Document 1 discloses a technique in which a cabling space of a resolver harness arranged between the motor and the transmission is minimized by fixing the harness by means of a harness protector, to thereby reduce the shaft length of the drive device. Further, in this technique, it is also possible to flexibly respond to expansion and contraction of the harness caused by heat from the motor.

In a motor equipped with a rotor which includes permanent magnets and a stator which includes a coil, heat is generated from the coil by energizing the coil, while the rotor or the stator itself is also caused to generate heat by the effect of a magnetic flux that passes through the inside of the rotor or the stator. Typically, in the motor, operation efficiency thereof is reduced due to a temperature increase resulting from heat generation. For this reason, it becomes necessary to provide appropriate cooling to the motor.

In this regard, Patent Document 2 discloses, in relation to technology for supplying a cooling oil to a coil end of a motor, a technique capable of effectively supplying the cooling oil to the coil end of the motor without causing an increase in size of a motor case and an increase in structural complexity.
Patent Document 1: JP 2005-254855 A
Patent Document 2: JP 2006-33939 A

DISCLOSURE OF THE INVENTION

Problems to be Solved by the Invention

Although the cabling space can be minimized through the use of the resolver harness described in Patent Document 1, the resolver harness rather obstructs a cooling oil path for delivering the cooling oil to a side surface of the coil end. With this in view, when the cooling oil path is arranged from an upper area of the coil end as described in Patent Document 2 rather than the side surface of the coil end, cooling of the upper area of the coil end is facilitated. In this case, however, the cooling oil supplied from the side surface of the coil end is reduced, which makes it difficult to maintain overall performance of cooling the coil end.

Further, the resolver harness should have a certain extent of extra length on a terminal side or a resolver side thereof in order to connect the resolver harness to a terminal base mounted on an upper surface of the motor case. Still further, when the harness protector is provided throughout the resolver harness as achieved in Patent Document 1, the number of assembling steps is increased because of the necessity to install the harness protector, for example, after the resolver harness is connected.

On the other hand, when multiple-point fixation is used instead of providing the harness protector, the extra length of the resolver harness incurs the risk of nipping the resolver harness when another component is installed, damaging the resolver harness due to physical contact with the rotor, or causing other problems.

Therefore, the present invention is directed to provide a vehicle drive device comprising a resolver harness fixture capable of preventing a resolver harness from being damaged while maintaining overall performance of cooling the coil end, and a cooling path which is not blocked by the resolver harness.

Means for Solving the Problems

In order to realize the above-described configuration, a vehicle drive device according to the present invention comprises a motor which drives a vehicle, a resolver which is placed in a motor case to detect a rotation angle of a rotor, and a plurality of cooling oil paths for supplying a cooling oil to a coil end of a stator. In the vehicle drive device, at least one of the cooling oil paths is composed of a delivery pipe which is bent in a direction orthogonal to a rotor shaft with the aim of sending the cooling oil to the coil end in an upper area of the motor. The delivery pipe is fixed to the motor case and retains the resolver harness at a cramp part formed on the delivery pipe, while guiding the resolver harness using a curved section of the delivery pipe, thereby arranging the resolver harness in the motor case so as not to interfere with the formed cooling oil paths.

Still further, in the vehicle drive device according to the present invention, a guide section for preventing the resolver harness from wobbling to a rotor side is provided to the delivery pipe, and the clamp part formed on the delivery pipe is a retainer member for retaining the resolver harness so as to cover a part of the resolver harness from the rotor side toward the motor case side.

Moreover, in the vehicle drive device according to the present invention, the delivery pipe and the clamp part are composed of a metallic material.

Effect of the Invention

An effect of using the vehicle drive device according to the present invention is that a cooling path capable of maintaining the overall performance of cooling the coil end can be formed. In addition, the present invention has another effect of establishing the cooling path in which the resolver harness can be protected against damages in such a manner that the clamp part and a curved section for preventing the wobbling are provided to the delivery pipe formed in the cooling path, to thereby fix the resolver harness.

Figure 1:
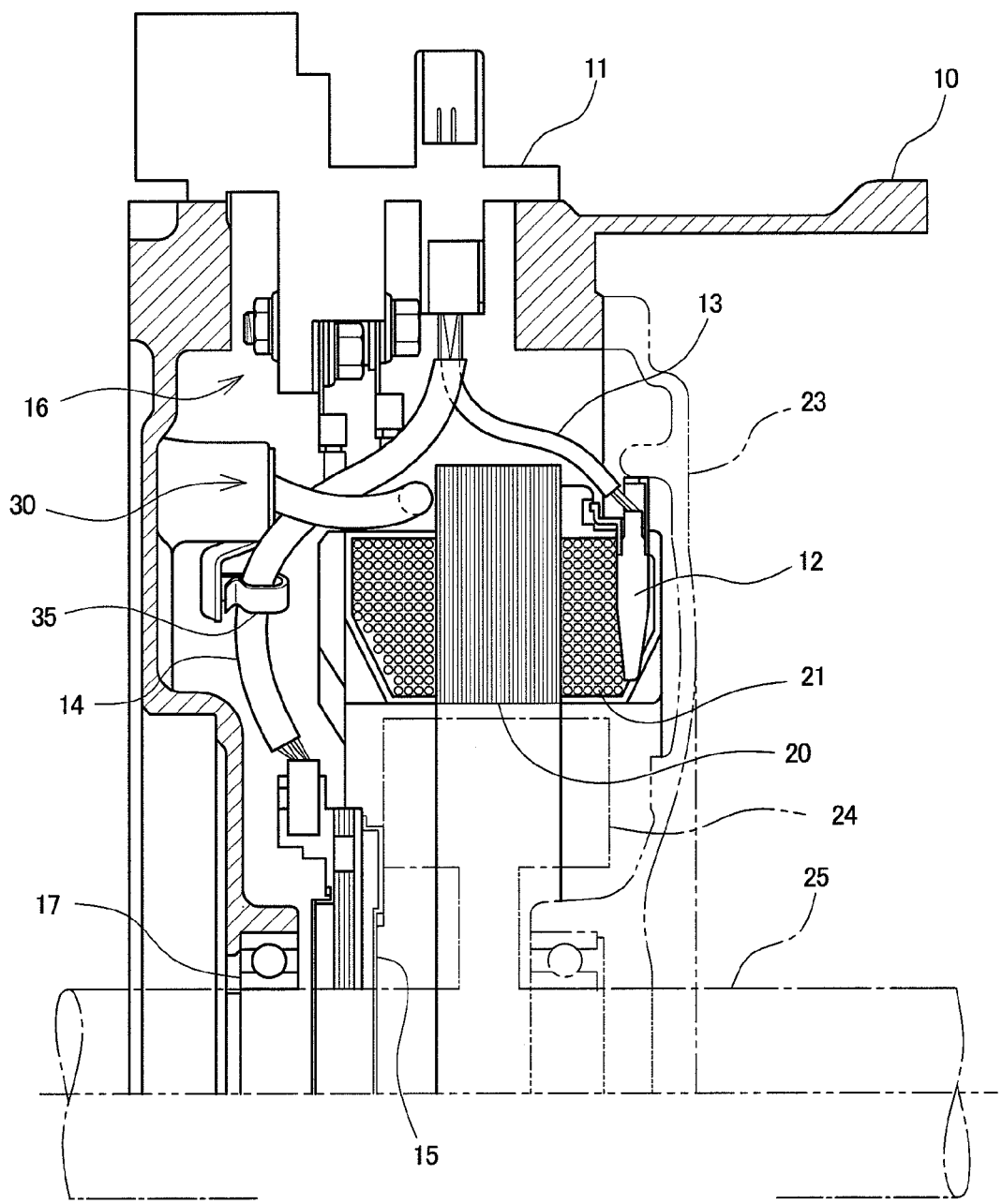
FIG. 1 is a cross sectional view showing a motor unit in a vehicle drive device according to an embodiment of the present invention.

DESIGNATION OF REFERENCE NUMERALS 1 vehicle drive device, 10 motor case, 11 terminal base, 12 temperature sensor, 13 temperature sensor harness, 14 resolver harness, 15 resolver, 17 rotor bearing, 20 coil end, 20 stator, 21 stator coil, 23 motor cover, 24 rotor, 25 rotor shaft, 30 delivery pipe, 31, 32, 33, 34 outlet port, 35 clamp part, 36 bracket, 37 fixture hole, 38 press-fitted section, 39 pipe body, 41 cooling oil reservoir.

BEST MODE FOR CARRYING OUT THE INVENTION

Hereinafter, a best mode for carrying out the present invention (hereinafter referred to as a preferred embodiment) will be described with reference to the drawings.

FIG. 1 shows a cross sectional view of a motor unit in a vehicle drive device 1. In the motor unit constituting a part of the vehicle drive device 1, there are installed a motor case 10, a motor cover 23, a stator 20, a rotor 24, a rotor shaft 25, and a rotor bearing 17 for supporting the rotor shaft 25. Further, inside the motor unit, there are provided a resolver 15 which detects a rotation angle of the rotor 24, a temperature sensor 12 which detects the temperature of a stator coil 21, a terminal base 11 to which U-phase, V-phase, and W-phase terminals extended from the coil end are connected, and to which a resolver harness 14 and a temperature sensor harness 13 are also connected, and a delivery pipe 30 which includes a clamp part 35 for retaining the resolver harness 14 and delivers a cooling oil to the coil end.

Figure 2:
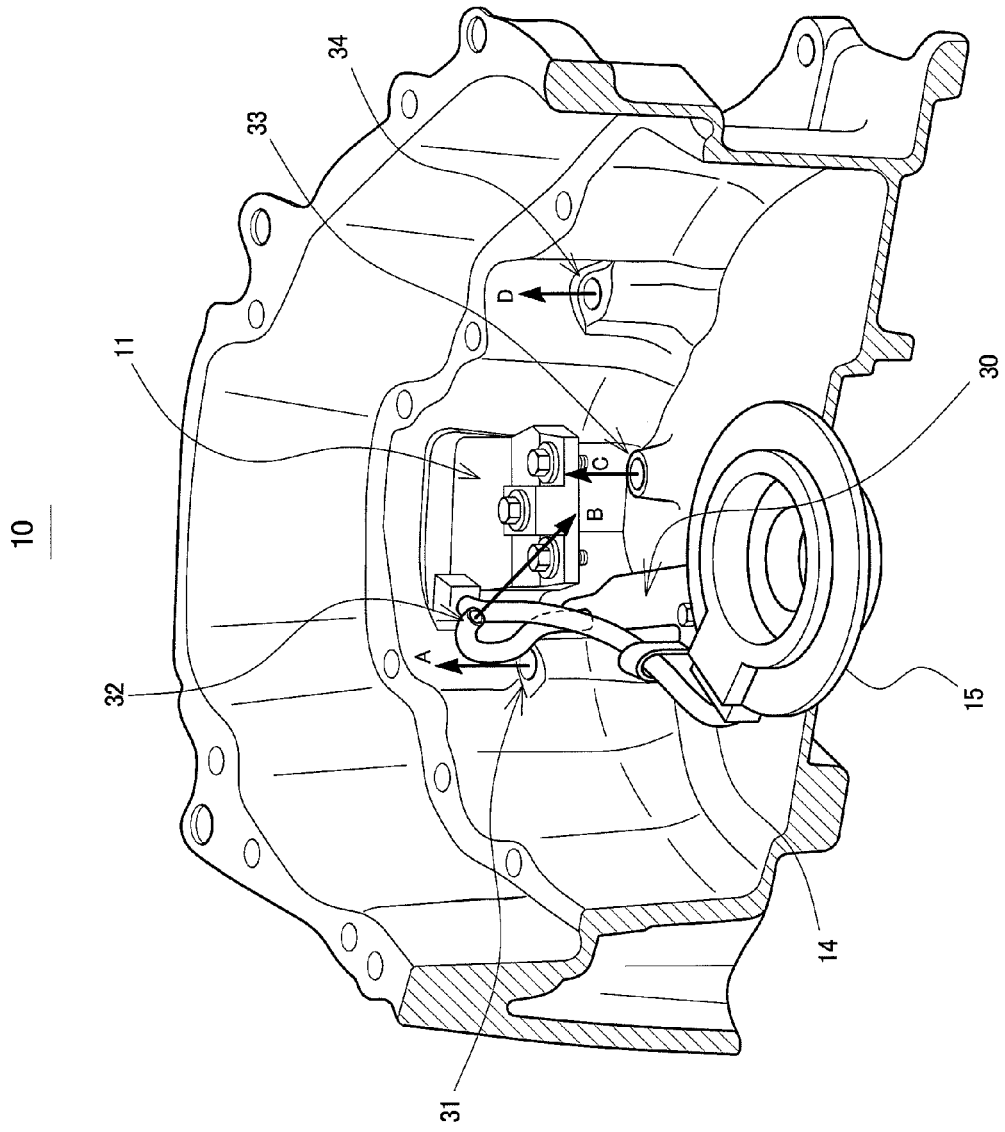
FIG. 2 is a perspective view showing a motor case in the vehicle drive device according to the embodiment of the present invention.

FIG. 2 is a perspective view showing a back side of the motor case 10. The resolver 15, the delivery pipe 30 which retains the resolver harness 14, the terminal base 11, and outlet ports (31, 32, 33, 34) for the cooling oil are shown on the motor case 10. It should be noted that arrows (A to D) in FIG. 2 indicate directions of outputting the cooling oil, and an output direction B from the delivery pipe 30 is established along a direction of motor rotation and directed to an upper area of the coil end. It is also noted that, for the sake of simplified description, the temperature sensor, the temperature sensor harness, and other components are not shown.

One of characteristic features of this embodiment is placement of the outlet ports in which the outlet ports 31, 33, 34 are disposed on a side surface of the motor case 10 to output the cooling oil along a direction of the rotor shaft for spraying the cooling oil on the coil end, and the outlet port 32 is disposed at a location, where the outlet port 32 is not blocked by the resolver harness 14, to spray the cooling oil in the upper area of the coil end along a direction orthogonal to the rotor shaft. Another feature is a holder of the resolver harness 14, which is mounted on the delivery pipe to thereby arrange the resolver harness below a bent section of the outlet port 32.

Figure 3:
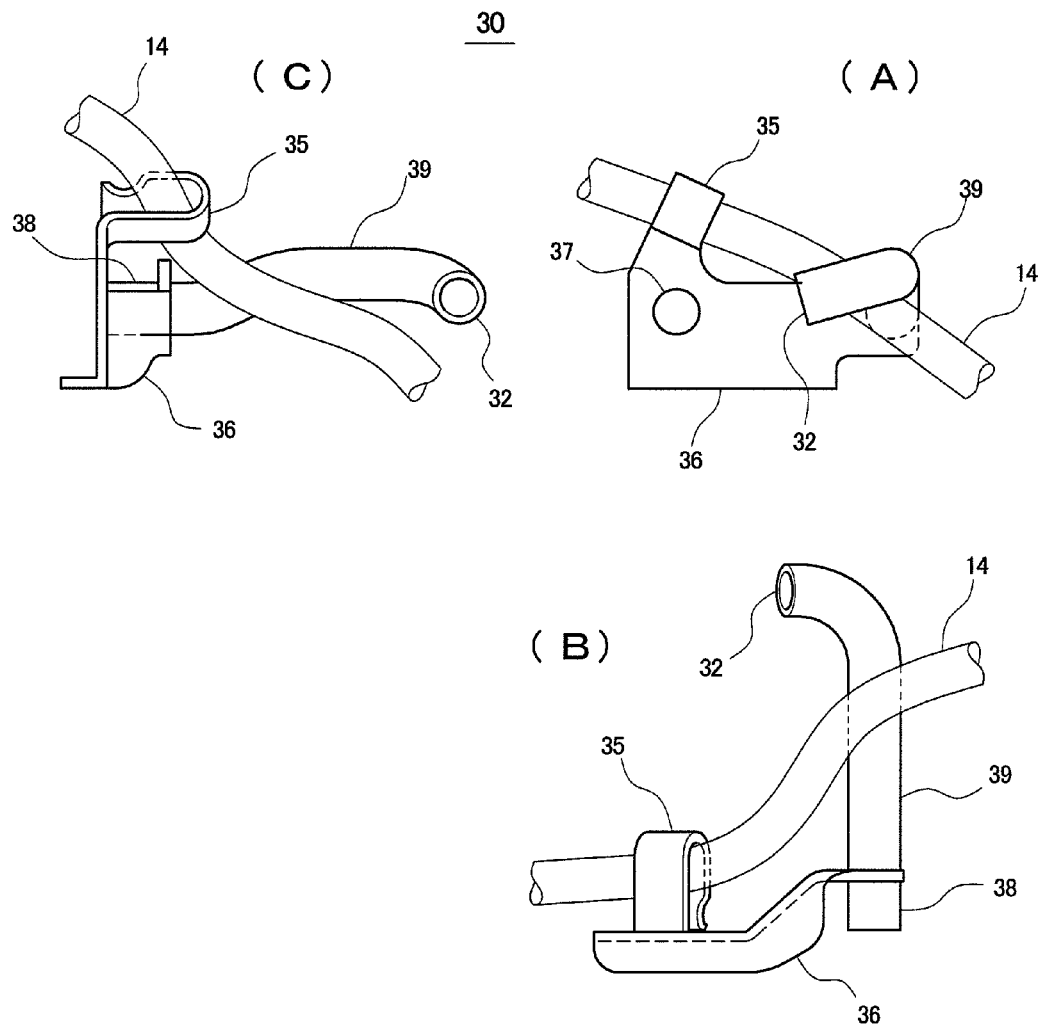
FIG. 3 is a diagram for explaining a positional relationship between a delivery pipe for delivering a cooling oil and a resolver harness according to the embodiment of the present invention.

FIGS. 3A, 3B, and 3C respectively show a front view (A), a bottom view (B), and a side view (C) to indicate a positional relationship between the resolver harness 14 and the delivery pipe 30 for delivering the cooling oil. As shown in FIG. 3A, a pipe body 39 including a bracket part 36, the outlet port 32 for delivering the cooling oil, and a press-fitted section 38 to be fitted into a cooling oil outlet port on the motor case, a clamp part 35 for retaining the resolver harness 14, and a fixture hole 37 used for fixing the delivery pipe to the motor case 10 by means of a screw are depicted for the delivery pipe 30.

Meanwhile, as shown in FIGS. 3B and 3C, the resolver harness 14 is guided by both the clamp part 35 and a shoulder of a curved section of the pipe body 39 so as to restrict movement of the resolver harness 14 toward a rotor side. It is to be noted that one end of the bracket 36 is provided with the clamp part 35, and the other end of the bracket 36 is bent for reinforcement and for protecting the resolver harness from being entangled during assembly.

As shown in the cross sectional view of the motor unit in FIG. 1, the resolver harness 14 is retained by the clamp part 35 of the delivery pipe 30 in addition to being guided by the shoulder of the curved section in the pipe body, and connected to the terminal base 11. In this way, a certain extent of an extra length can be obtained on a terminal side or a resolver side of the resolver harness to thereby aid in easy coupling of the resolver harness, while assembling operation can be performed without causing the resolver harness to block the outlet port of the delivery pipe 30.

Figure 4:
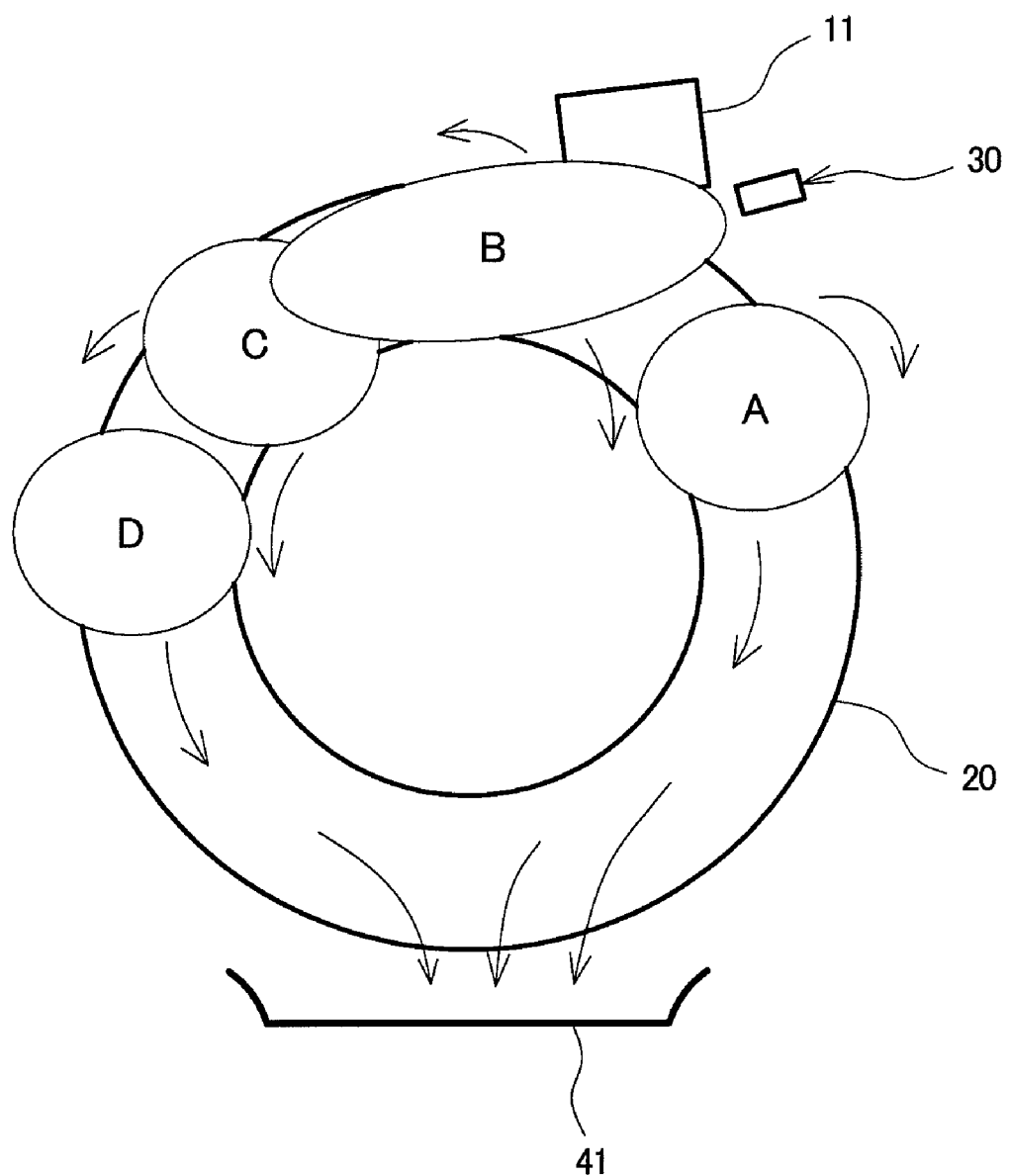
FIG. 4 is a diagram for explaining a state of spraying the cooling oil on a coil end according to the embodiment.

FIG. 4 shows a state where the cooling oil is sprayed on the coil end along spraying directions A to D corresponding to the outlet ports 31 to 34 disposed on the motor case of FIG. 1. Traces of the cooling oil delivered along the direction of the rotor shaft are depicted in the spraying directions A, C, and D, and a trace of the cooling oil sprayed from the delivery pipe 30 is depicted in the spraying direction B. Because U-phase, V-phase, and W-phase connecting wires extended from the coil end to the terminal base 11 are arranged in the spraying direction B, the cooling oil is broadly sprayed along a circumferential direction of the stator coil without causing blockage of the cooling oil path. As shown in FIG. 4, the cooling oil is sprayed in all parts of the coil end from the upper area of the coil end 20 of the stator, and the cooling oil is collected in a cooling oil reservoir 41 after passing through the coil end.

When the vehicle drive device according to this embodiment is used as described above, because the resolver harness is prevented from blocking the cooling oil path through which the cooling oil is delivered to the side surface of the coil end, the entire side surface of the coil end can be cooled. In addition, appropriately holding or supporting the extra length of the resolver harness can prevent the resolver harness from being nipped during assembly or damaged due to the contact between the resolver harness and the rotor.

INDUSTRIAL APPLICABILITY

The vehicle drive device according to the present invention can be applied to electric vehicles, hybrid vehicles, and other vehicles.

What is claimed is:

1. A vehicle drive device comprising:
a motor that drives a vehicle;
a resolver that is disposed on a motor case to detect a rotation angle of a rotor, and
a plurality of cooling oil paths through which a cooling oil is supplied to a coil end of a stator, wherein
at least one of the cooling oil paths is composed of a delivery pipe which is bent in a direction orthogonal to a rotor shaft in order to deliver the cooling oil to the coil end in an upper area of the motor, and
the delivery pipe is fixed to the motor case and retains a resolver harness at a clamp part formed on the delivery pipe, while guiding the resolver harness using a curved section of the delivery pipe, thereby arranging the resolver harness in the motor case so as not to interfere with the formed cooling oil path.

2. A vehicle drive device according to claim 1, wherein:
the delivery pipe is equipped with a guide section for preventing the resolver harness from wobbling toward a rotor side, and
the clamp part formed on the delivery pipe is a retainer member for retaining the resolver harness so as to cover a part of the resolver harness from the rotor side toward the motor case side.

3. A vehicle drive device according to claim 2, wherein the clamp part is integrally formed with the delivery pipe.

4. A vehicle drive device according to claim 3, wherein the delivery pipe and the clamp part are composed of a metallic material.

* * * * *